(12) United States Patent
Tiwari et al.

(10) Patent No.: US 10,498,537 B2
(45) Date of Patent: Dec. 3, 2019

(54) SYSTEM AND METHOD FOR PROVIDING SECURE COLLABORATIVE SOFTWARE AS A SERVICE (SAAS) ATTESTATION SERVICE FOR AUTHENTICATION IN CLOUD COMPUTING

(71) Applicant: INSTITUTE FOR DEVELOPMENT AND RESEARCH IN BANKING TECHNOLOGY (IDRBT), Hyderabad (IN)

(72) Inventors: Deepnarayan Tiwari, Hyderabad (IN); Gangadharan Ramakrishnan Gangadharan, Hyderabad (IN)

(73) Assignee: INSTITUTE FOR DEVELOPMENT AND RESEARCH IN BANKING TECHNOLOGY (DRBT), Telangana (IN)

( * ) Notice: Subject to any disclaimer, the term of this patent is extended or adjusted under 35 U.S.C. 154(b) by 159 days.

(21) Appl. No.: 15/605,498

(22) Filed: May 25, 2017

(65) Prior Publication Data
US 2018/0034641 A1 Feb. 1, 2018

(30) Foreign Application Priority Data
Aug. 1, 2016 (IN) .............................. 201641026254

(51) Int. Cl.
*H04L 9/32* (2006.01)
*H04L 9/08* (2006.01)
*H04L 29/06* (2006.01)

(52) U.S. Cl.
CPC ............ *H04L 9/3247* (2013.01); *H04L 9/083* (2013.01); *H04L 63/0807* (2013.01); *H04L 2209/46* (2013.01); *H04L 2209/76* (2013.01)

(58) Field of Classification Search
CPC ... H04L 9/3247; H04L 9/083; H04L 63/0807; H04L 2209/76
See application file for complete search history.

(56) References Cited

U.S. PATENT DOCUMENTS 7,590,236 B1 * 9/2009 Boneh ................. H04L 63/0428
380/277
9,363,086 B2 * 6/2016 Uzun .................... H04L 9/3236
(Continued)

*Primary Examiner* — Mohammad W Reza
*Assistant Examiner* — Michael M Lee
(74) *Attorney, Agent, or Firm* — Barry Choobin; Patent 360 LLC

(57) ABSTRACT

An architecture and a method are disclosed for providing secure, scalable, and dynamic user configuration in the distributed network for the cloud computing to provide authentication and authorization for the plurality of the users to use the SaaS service. The system includes a hierarchical tree structure that configures the cloud-computing model by using the certificate less identity-based cryptography to establish the hierarchical relationship between the participating entities. The hierarchical model provides a hierarchical certificateless aggregate signature (HCL-AS) for authentication and non-repudiation for SaaS in cloud computing. The HCL-AS generates a collaborative aggregate signature at a parent level of each child node (users) without the loss of identity of the users in the resulting signature and sends an aggregated signature to the third-party software provider. The HCL-AS significantly reduces the computation and communication cost during the user verification and authentication.

12 Claims, 9 Drawing Sheets

(56) References Cited

U.S. PATENT DOCUMENTS

| | | | | |
|---|---|---|---|---|
| 2006/0155985 A1* | 7/2006 | Canard | ................... | G06F 21/33 |
| | | | | 713/156 |
| 2013/0007453 A1* | 1/2013 | Benantar | ............... | H04L 9/0844 |
| | | | | 713/169 |
| 2014/0331297 A1* | 11/2014 | Innes | ...................... | H04L 63/08 |
| | | | | 726/7 |
| 2016/0226830 A1* | 8/2016 | Steeves | ............... | H04L 63/0428 |
| 2017/0034186 A1* | 2/2017 | Zheng | ................... | H04L 63/126 |

* cited by examiner

SYSTEM AND METHOD FOR PROVIDING SECURE COLLABORATIVE SOFTWARE AS A SERVICE (SAAS) ATTESTATION SERVICE FOR AUTHENTICATION IN CLOUD COMPUTING

CROSS REFERENCE TO RELATED APPLICATION

The embodiments herein claims the priority of the Indian Provisional Patent Application with the serial number 201641026254 filed on Aug. 1, 2016 with the title, "A SYSTEM AND METHOD FOR PROVIDING SECURE COLLABORATIVE SOFTWARE AS A SERVICE (SAAS) ATTESTATION SERVICE FOR AUTHENTICATION IN CLOUD COMPUTING" and the entire contents of which is included as reference herein.

BACKGROUND

Technical Field

The embodiments herein are related to an architecture for providing secure, reliable, scalable, and dynamic configuration of cloud services. The embodiments herein are particularly related to a framework that works as a collaborative SaaS attestation for authenticating in cloud computing. The embodiments herein are more particularly related to a framework for providing hierarchical certificate less aggregate signature for authentication and non-repudiation for SaaS.

Description of the Related Art

Cloud computing enables ubiquitous, convenient, on-demand network access to a shared pool of configurable computing resources. Cloud services are sometimes provided as Software as a Service (SaaS). In a SaaS model, software applications are hosted on a cloud and managed by a service provider. The users are enabled to download software applications from the cloud, once they are authenticated and authorized. While accessing SaaS in a collaborative business model, security is necessary.

In a traditional public key cryptography (PKC), a random public key of a user is associated with a certificate. A certificate is a signature of trusted Certificate Authority (CA) on the public key. In the public key infrastructure (PKI), a user generates a digital signature by using her own private key and a verifier verifies the signature by using the user public key. In this process, a certificate authority binds a user's identity with a public key by issuing a digital certificate. Before using the public key of the user, the participant first confirms the certificate of that user. As a result, a considerable amount of the storage and computation cost is required to manage PKI certificate.

In Identity-based Public Key Cryptography (ID-PKC), a publicly known information such as email address is used as a user's public key. However, an inherent problem of ID-PKC is that a Key Generation Center (KGC) is used to generate any user's private key using a master key of KGC. However, a malicious KGC is able to forge the signature of any signer due to accessibility of the private key of the signer. In order to solve this problem, certificate less signature scheme (CLS) is introduced, to generate the public/private key pair by combining a master key of KGC together with a random secret value generated by the user. However, constructing a secure and efficient CLS scheme is still a challenge because it involves authenticating an identity string as a public key of the user. Further scalability is limited, while constructing a secure CLS scheme.

An aggregate signature is able to combine n signatures on n messages from n users into a single short signature, and the resulting signature is able to convince the verifier that the n users signed the n corresponding messages. This feature makes the aggregate signature very useful especially in the environments with low bandwidth communication, low storage and low compatibility since an aggregate signature greatly reduces the total signature length and verification cost.

In view of the above discussion, there exists a need for a scalable architecture for providing the collaborative SaaS to the users. Further, there is a need for a framework that provides a hierarchical certificate less aggregate signature for authentication and non-repudiation for SaaS.

The abovementioned shortcomings, disadvantages and problems are addressed herein, which will be understood by reading and studying the following specification.

OBJECTS OF THE EMBODIMENTS

The primary object of the embodiments herein is to provide an authentication framework for a scalable architecture to provide a dynamic user configuration and the availability of the requested SaaS in the cloud-computing model.

Another object of the embodiments herein is to provide a framework that works as a collaborative SaaS attestation for authenticating in cloud computing.

Yet another object of the embodiments herein is to provide an aggregate signature for hierarchical certificateless architecture.

Yet another object of the embodiments herein is to provide a hierarchical certificateless aggregate signature (HCL-AS) for authentication and non-repudiation of SaaS.

Yet another object of the embodiments herein is to provide a framework with HCL-AS model generating a collaborative aggregate signature at the parent level of the child node (users) without the loss of identity of the users in the resulting signature.

Yet another object of the embodiments herein is to provide a framework that reduces computation and communication costs involved in verification of the user's authentication by generating a single collaborative aggregated signature on a common request of the service that is requested by the users instead of verifying multiple service signatures and the user requests independently.

These and other objects and advantages of the embodiments herein will become readily apparent from the following detailed description taken in conjunction with the accompanying drawings.

SUMMARY

The embodiments herein disclose an architecture and a method for providing a secure authentication scheme for SaaS in cloud computing. Further, the architecture provides a collaborative SaaS attestation for authentication in cloud computing. The architecture is facilitated with a hierarchical certificateless aggregate signature (HCL-AS) for authentication and non-repudiation for SaaS. The software play store is configured to issue as many software instances as the number of the requests from an aggregated subscription request signature that is generated by the cloud provider using the HCL-AS rather than processing each cloud user's request individually. The advantage of the hierarchical scheme is in using a scalable architecture and an aggregate signature operation during the subscription requests. The scheme significantly reduces the computation and communication costs by verifying the aggregate signature in the hierarchical model from the users instead of verifying the n (number of) signatures from the n (number of) users independently.

According to one embodiment herein, a computer implemented method comprising instructions stored on a non-transitory computer-readable storage medium and executed on a computing device provided with a hardware processor and a memory for providing a hierarchical certificateless aggregate signature architecture for authentication and non-repudiation for SaaS includes generating a collaborative service provision access by using the HCL-AS for the SaaS in a cloud computing environment. Before initiating a request to utilize the subscription-based software as a service (SaaS) by a user, a hierarchical relationship is initialized among a Contoller Key Generation Center (C-KGC), a plurality of users, and a Software Key Generation Center (S-KGC or Software Play Store) by a Root Key Generation Center (R-KGC). The user is enabled to make an authentication token and a service request token for accessing the subscription based SaaS by generating the hierarchical certificateless signature (HCLS). The authenticity of the user is verified by the controller key generation center (C-KGC) to access the SaaS service using the generated authentication token. The credential of the user is verified by the C-KGC using the generated service token. Thereafter, a plurality of subscription requests from a plurality of users are aggregated into an aggregated subscription request by the C-KGC. The master C-KGC generates an aggregate signature for the aggregated subscription request after verification of the authentication token and the service request token. The aggregate signature is received by the S-KGC and further verified by the S-KGC to provide software service corresponding to the subscription request. After verifying the aggregate signature, software service is provided to the users from the software play store.

According to an embodiment herein, an aggregate signature is generated at a parent level of each user without a loss of identity of the user. The aggregate signature is transmitted from the C-KGC to the Software Key Generation Center (S-KGC) or software play store. The S-KGC is configured to perform verification and authentication of the user identity and a plurality of user requests. Further, a hierarchical relationship is established from a root node to a plurality of child nodes or users collaboratively.

According to an embodiment herein, a public parameter is generated for the user by a root key generation center. The public parameter comprises a master public key (mpk) and a master secret key (msk). Further, service authorization and authentication is performed for the users by a controller key generation center. The controller key generation center is further configured to generate a partial private key to the users. The subscription request from a plurality of users is verified simultaneously by the Software Key Generation Center (S-KGC) or the Software Play Store.

According to an embodiment herein, the controller key generation center is a web server configured to process subscription requests from the users. Further, the S-KGC is configured to delegate a capability to issue the software license to the C-KGC.

According to an embodiment herein, a partial private key is generated by the C-KGC for the connected users belonging to a parent node of the C-KGC. The C-KGC partial private key is combined with the user's secret key to get the user's private key. Thereafter, a user makes a subscription request to the cloud provider for accessing the software services. The cloud provider receives such a subscription request and verifies the authorization of the users. According to one embodiment of the present invention, the cloud provider is configured to aggregate the similar subscription requests from the plurality of users into a single subscription request and generates an aggregate signature. The aggregate signature is sent to the S-KGC for verification.

A computer system architecture for providing a hierarchical certificateless aggregate signature (HCL-AS) for SaaS in a cloud computing system is disclosed. The architecture includes a root key generation center (R-KGC) configured to receive a subscription request from a user for accessing Software as a Service (SaaS) from a cloud server. The R-KGC is configured to generate a public parameter for the user. The R-KGC is further configured to initialize a hierarchical relationship between a C-KGC, a plurality of users, and a S-KGC, and wherein the public parameter comprises a master public key (mpk) and a master secret key (msk). The architecture includes a plurality of controller key generation center (C-KGC) configured to perform service authorization. The controller key generation center is further configured to perform authentication for the plurality of users, The controller key generation center is further configured to generate a partial private key to the users. The partial private key is used to perform a hierarchical authentication of a node associated to the C-KGC. The C-KGC is configured to generate an aggregated subscription request signature or aggregate signature by combining a plurality of subscription requests. The software key generation center (S-KGC) is configured to receive aggregated signature from the C-KGC. The S-KGC is configured to verify the subscription request and provide requested software service to the user.

According to an embodiment herein, the C-KGC is further configured to generate a combined subscription request signature at a parent level of each user combining a plurality of subscription requests. The C-KGC is further configured to generate an aggregated subscription request signature or aggregate signature by aggregating the plurality of combined subscription request signature at the parent level. The C-KGC is configured to transmit the aggregated subscription request signature or aggregate signature to the S-KGC. The controller key generation center is a web server configured to process requests from the users.

According to an embodiment herein, the S-KGC is further configured to perform verification and authentication of the user identity and a plurality of user requests. Further, the S-KGC is further configured to identify the number of the software instances to be issued with license agreement under the C-KGCs. Furthermore, the S-KGC is configured to use the public parameters generated by the R-KGC and execute private key extract and public key extract to set a private key and public key pair respectively.

According to one embodiment herein, the HCL-AS scheme is configured to generate a collaborative aggregate signature in response to a plurality of user requests (for software subscription services). According to one embodiment herein, the user utilizes the HCL-AS scheme to generate an authentication token and a service request token. The authentication token is verified to validate the authenticity of the user to access the requested SaaS service. The service request token is verified to check the credential and authorization of the user for the demanding service. When the authentication token and the service request token are verified, an aggregate signature is generated at a parent level of each user (child node) without a loss of identity of the user. Further, the aggregate signature is sent to the software play store, for verification and authentication of the user identity and the user requests. The hierarchical architecture comprises four modules. The four modules include a Root Key Generation Center (R-KGC) module, a Controller Key Generation Center (C-KGC) module, a set of Users, and a Software Play Store (S-KGC). The R-KGC along with C-KGC is configured to provide a secure and scalable authentication for the user request to access SaaS.

According to one embodiment herein, the Root Key Generation Center (R-KGC) is configured to generate a master public key (mpk) and a master secret/private key (msk). In HCL-AS, a hierarchical key agreement is managed by authorizing a request from each child node (user) to the root node in the hierarchical tree. The R-KGC is configured to initialize the hierarchical relationship between the participating entities such as C-KGC, the users, and S-KGC. In this process, the R-KGC is configured to initiate the partial private key generation process to the C-KGC. Then, each user (child node) sends a request to a corresponding parent node (C-KGC) to obtain a partial private key.

The C-KGC is configured to verify the request of the users by using the identity of the child node. When the request of the user is verified successfully, then the parent node (C-KGC) is configured to send a partial private key to the requested users. The user utilizes the partial private key to perform a hierarchical authentication of the node. The hierarchical authentication process involves identifying the authenticated parent node and as well as a participating node up to the root node. Each participating node is provided with an own derived secret value (master secret key) that is combined with the partial private key which is generated by the parent node to obtain a private key. Thus, the R-KGC is configured to authenticate the child C-KGC node request and the parent C-KGC node is configured to authenticate the user request.

According to one embodiment herein, the Controller Key Generation Center (C-KGC) is configured to function as a service authorization and authentication agent for the users. Further, the C-KGC is configured to function as a partial private key issuing authority to the users, a resource access controller, and a service request initiator for the users. Furthermore, the C-KGC is configured to function as a proxy agent to issue subscription service of user requested software's on behalf of the software provider. While authorizing the user requests, the C-KGC is configured to register with the R-KGC using its identity information C-KGC$_{id_i}$. The R-KGC is configured to generate a partial private key generation $D_i$ of the C-KGC$_{id_i}$. Once the partial private key is generated, the C-KGC is configured to invoke the functions private-key-extract( ) and public-key-extract( ) to set the private key and public key pair respectively. The C-KGC is configured to invoke the private-key-extract( ) for $\{s_i, D_i\}$, and to invoke the public-key-extract( ) for $\{P_i, Q_{ij}\}$.

Further, the C-KGC is configured to verify the authentication token and the service request token generated by the users. Once the authentication token and the service request token are verified, the C-KGC is configured to aggregate the service request signatures from the corresponding users and generates a combined subscription request signature. A collaborative group of each C-KGC at the first level is configured to create the combined subscription request signature by aggregating the service request signatures of the corresponding users. Then, one C-KGC from the collaborative group of C-KGC is selected as a master C-KGC to perform re-aggregation over the combined subscription request signature of each C-KGC to generate an aggregated subscription request signature (aggregate signature). Thus, the master C-KGC is configured to generate a single combined subscription signature by using the HCL-AS and the aggregate signature is sent to the S-KGC. The C-KGC is implemented in a distributed server over the zone wise distributed network having memory and one or more processors. The C-KGC has a web server to process the request of the users.

According to one embodiment herein, a user $U_{ji}$ represents a user $U_j$ associated with the parent node C-KGC$_{id_i}$. The user executes $\{s_j, D_j\} \leftarrow$ private-key-extract( ), $\{P_j, Q_j\} \leftarrow$ public-key-extract( ) to set the private key and public key pair respectively. Each user device is configured with a memory and one or more processors. According to an embodiment herein, additional hardware such as dedicated circuits, a field programmable gate array (FPGA) are implemented in the user device. According to an embodiment herein, each user is configured to reside/exist on separate computers and/or browsers.

According to one embodiment herein, the S-KGC is an authorized software play store to get the registered the authenticated software from the third party software vendor and is configured to offer SaaS to the users with the collaboration of the software provider. The S-KGC is configured to receive the aggregated signature from the master C-KGC. The S-KGC is configured to verify the subscription requests from the plurality of users simultaneously. Further, the S-KGC is configured to identify the number of the software instances to be issued with license agreement under the C-KGCs. The S-KGC is configured to delegate the function/capacity/capability to issue the software license to the C-KGC. The S-KGC uses the public parameters of the R-KGC and executes $\{S_s, D_s\} \leftarrow$ private-key-extract( ), $\{P_s, Q_s\} \leftarrow$ public-key-extract( ) to set a private key and public key pair respectively.

According to one embodiment herein, a method is provided to generate the collaborative service provision access by using the HCL-AS for the SaaS in a cloud computing environment. The method involves a user making a request to utilize the subscription-based software as a service (SaaS) to a Controller Key Generation Center (C-KGC) in the cloud computing environment. The user utilizes the hierarchical certificateless signature (HCLS) to generate an authentication token and a service request token. The user's authentication is verified to access the requested software service in the cloud computing environment by the C-KGC. The C-KGC uses the authentication token to validate and verify the authenticity of the users to access the requested SaaS instance. The C-KGC uses the service request token to verify the credentials and authorization of the user for the requested service. A partial private key is generated by the C-KGC for the connected users. The C-KGC partial private key is combined with the user's secret key to get the user's private key. Thereafter, a user makes a subscription request to the cloud service provider for accessing the software services. The cloud provider receives such a subscription request and verifies the authorization of the users. According to one embodiment herein, the cloud provider is configured to aggregate the similar subscription requests from the plurality of users into a single subscription request and generates an aggregate signature. The aggregate signature is sent to the software play store (S-KGC). After verifying the aggregate signature, the software service is provided to the users from the software play store (S-KGC).

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
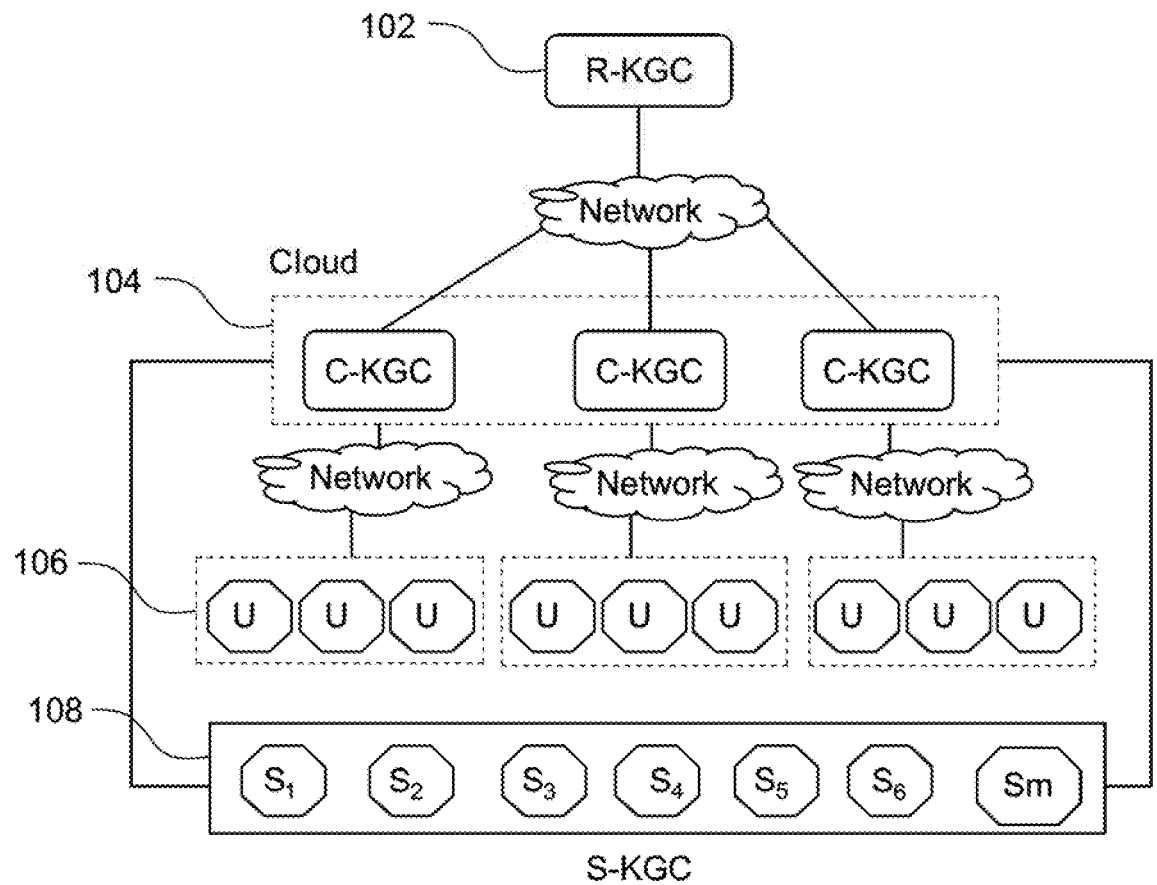
FIG. 1 illustrates a circuit block diagram of a system architecture for secure collaborative SaaS (SecAtt-SaaS) for authentication in cloud computing environment, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments herein are described in sufficient detail to enable those skilled in the art to practice the embodiments herein and it is to be understood that other changes may be made without departing from the scope of the embodiments herein. The following detailed description is therefore not to be taken in a limiting sense.

The embodiments herein disclose an architecture and a method for providing a secure authentication scheme for Software as a Service (SaaS) in cloud computing. Further, the architecture provides a collaborative SaaS attestation for authentication in cloud computing. The architecture is facilitated with a hierarchical certificateless aggregate signature (HCL-AS) for authentication and non-repudiation for SaaS. The software play store (S-KGC) is configured to issue as many software instances as the number of the requests from an aggregated subscription request signature that is generated by the cloud service provider using the HCL-AS rather than processing each cloud user's request individually. The advantage of the hierarchical scheme is in using a scalable architecture and an aggregate signature operation during the subscription requests. The scheme significantly reduces the computation and communication costs by verifying the aggregate signature in the hierarchical model from the users instead of verifying the n (number of) signatures from the n (number of) users independently.

According to one embodiment herein, a computer implemented method comprising instructions stored on a non-transitory computer-readable storage medium and executed on a computing device provided with a hardware processor and a memory for providing a hierarchical certificateless aggregate signature architecture for authentication and non-repudiation for SaaS includes generating a collaborative service provision access by using the HCL-AS for the SaaS in a cloud computing environment. A user makes a request to utilize the subscription-based software as a service (SaaS). A subscription request to utilize the subscription-based software is received from a user by a root key generation center (R-KGC). Further, a hierarchical relationship is initialized between a C-KGC, a plurality of users, and a S-KGC by the R-KGC. The user is enabled to generate an authentication token and a service token for the subscription request utilizing the hierarchical certificateless signature (HCLS) architecture. The authenticity of the user is verified by the controller key generation center (C-KGC) to access the SaaS service using the generated authentication token. The credential of the user is verified by the C-KGC using the generated service token. Thereafter, a plurality of subscription requests from a plurality of users are aggregated into an aggregated subscription request by the C-KGC. An aggregate signature is generated for the aggregated subscription request after verification of the authentication token and the service token by the C-KGC. The aggregate signature is received by the S-KGC and further verified by the S-KGC to provide software service corresponding to the subscription request. After verifying the aggregate signature, the software service is provided to the users from the software play store (S-KGC).

According to an embodiment herein, an aggregate signature is generated at the parent level of each user without the loss of identity of the user. The aggregate signature is transmitted from the C-KGC to the Software Key Generation Center (S-KGC) or software play store. The S-KGC is configured to perform verification and authentication of the user identity and a plurality of user requests. Further, a hierarchical relationship is established from the root node to a plurality of child nodes or users collaboratively According to an embodiment herein, a public parameter is generated for the user by the root key generation center. The public parameter comprises a master public key (mpk) and a master secret key (msk). Further, service authorization and authentication is performed for the users by a controller key generation center. The controller key generation center (C-KGC) is further configured to generate a partial private key to the users. The subscription request from a plurality of users is verified simultaneously by the Software Key Generation Center (S-KGC) or the Software Play store.

According to an embodiment herein, the controller key generation center (C-KGC) is a web server configured to process subscription requests from the users. Further, the S-KGC is configured to delegate a capability to issue the software license to the C-KGC.

According to an embodiment herein, a partial private key is generated by the C-KGC for the connected users belonging to the parent node of the C-KGC. The C-KGC partial private key is combined with the user's secret key to get the user's private key. Thereafter, a user makes a subscription request to the cloud service provider for accessing the software services. The cloud service provider receives such a subscription request and verifies the authorization of the users. According to one embodiment of the present invention, the cloud service provider is configured to aggregate the similar subscription requests from the plurality of users into a single subscription request and generates an aggregate signature. The aggregate signature is sent to the S-KGC for verification.

A computer system architecture for providing a hierarchical certificateless aggregate signature (HCL-AS) for SaaS in a cloud computing system is disclosed. The architecture includes a root key generation center (R-KGC) configured to receive a subscription request from a user for accessing software services (SaaS) from a cloud server. The R-KGC is configured to generate a public parameter for the user. The R-KGC is further configured to initialize a hierarchical relationship between a C-KGC, a plurality of users, and a S-KGC, and wherein the public parameter comprises a master public key (mpk) and a master secret key (msk). The architecture includes a plurality of controller key generation center (C-KGC) configured to perform service authorization. The controller key generation center is further configured to perform authentication for the plurality of users. The controller key generation center is further configured to generate a partial private key to the users. The partial private key is used to perform a hierarchical authentication of a node associated to the C-KGC. The C-KGC is configured to generate an aggregated subscription request signature or aggregate signature by combining a plurality of subscription requests. The software key generation center (S-KGC) is configured to receive aggregated signature from the C-KGC. The S-KGC is configured to verify the subscription request and provide requested software service to the user.

According to an embodiment herein, the C-KGC is further configured to generate a combined subscription request signature at a parent level of each user combining a plurality of subscription requests. The C-KGC is further configured to generate an aggregated subscription request signature or aggregate signature by aggregating the plurality of combined subscription request signature at the parent level. The C-KGC is configured to transmit the aggregated subscription request signature or aggregate signature to the S-KGC. The controller key generation center is a web server configured to process requests from the users.

According to an embodiment herein, the S-KGC is further configured to perform verification and authentication of the user identity and a plurality of user requests. Further, the S-KGC is further configured to identify the number of the software instances to be issued with license agreement under the C-KGCs. Furthermore, the S-KGC is configured to use the public parameters generated by the R-KGC and execute private-key-extract( ) and public-key-extract( ) to set a private key and public key pair respectively.

According to one embodiment herein, the HCL-AS scheme is configured to generate a collaborative aggregate signature in response to a plurality of user requests (for software subscription services). According to one embodiment herein, the user generates an authentication token and a service request token by using the Hierarchical Certificateless Signature (HCLS). The authentication token is verified to validate the authenticity of the user to access the requested SaaS service. The service request token is verified to check the credential and authorization of the user for the demanding service. When the authentication token and the service request token are verified, an aggregate signature is generated at the parent level of each user (child node) without the loss of identity of the user. Further, the aggregate signature is sent to the software play store, for verification and authentication of the user identity and the user requests. The hierarchical architecture comprises four modules. The four modules include a Root Key Generation Center (R-KGC) module, a Controller Key Generation Center (C-KGC) module, a set of Users, and Software Play Store (S-KGC). The R-KGC along with C-KGC is configured to provide a secure and scalable authentication for the user request to access SaaS.

According to one embodiment herein, the Root Key Generation Center (R-KGC) is configured to generate a master public key (mpk) and a master secret/private key (msk). In HCL-AS, a hierarchical key agreement is managed by authorizing a request from each child node (user) to the root node in the hierarchical tree. The R-KGC is configured to initialize the hierarchical relationship between the participating entities such as C-KGC, the users, and S-KGC. In this process, the R-KGC is configured to initiate the partial private key generation process to the C-KGC. Then, each user (child node) sends a request to the corresponding parent node (C-KGC) to obtain a partial private key.

The C-KGC is configured to verify the request of the users by using the identity of the child node. When the request of the user is verified successfully, then the parent node (C-KGC) is configured to send a partial private key to the requested users. The user utilizes the partial private key to perform a hierarchical authentication of the node. The hierarchical authentication process involves identifying the authenticated parent node and as well as a participating node up to the root node. Each participating node is provided with an own derived secret value (master secret key) that is combined with the partial private key which is generated by the parent node to obtain a private key. Thus, the R-KGC is configured to authenticate the child C-KGC node request and the parent C-KGC node is configured to authenticate the user request.

According to one embodiment herein, the Controller key generation center (C-KGC) is configured to function as a service authorization and authentication agent for the users. Further, the C-KGC is configured to function as a partial private key issuing authority to the users, a resource access controller, and a service request initiator for the users. Furthermore, the C-KGC is configured to function as a proxy agent to issue subscription service of user requested software's on behalf of the software provider. While authorizing the user requests, the C-KGC is configured to register with the R-KGC using its identity information $C\text{-}KGC_{id_i}$. The R-KGC is configured to generate a partial private key generation $D_i$ of the $C\text{-}KGC_{id_i}$. Once the partial private key is generated, the C-KGC is configured to invoke the function private-key-extract( ) and public-key-extract( ) to set the private key and public key pair respectively. The C-KGC is configured to invoke $\{s_i, D_i\}$ for a private-key-extract ( ), and invokes $\{P_i, Q_{ij}\}$ for a public-key-extract( ).

Further, the C-KGC is configured to verify authentication token and service request token generated by the users. Once the authentication token and the service request token are verified, the C-KGC is configured to aggregate the service request signatures from the corresponding users and generates a combined subscription request signature. A collaborative group of each C-KGC at a first level is configured to create the combined subscription request signature by aggregating the service request tokens (signatures) of the corresponding users. Then, one C-KGC from the collaborative group of C-KGC is selected as a master C-KGC to perform a re-aggregation operation over the combined subscription request signature of each C-KGC to generate an aggregated subscription request signature (aggregate signature). Thus, the master C-KGC is configured to generate a single combined subscription signature by using the HCL-AS and the aggregate signature is sent to the S-KGC. The C-KGC is implemented in a distributed server over the zone wise distributed network having memory and one or more processors. The C-KGC has a web server to process the request of the users.

According to one embodiment herein, a user $U_j^i$ represents a user $U_j$ associated with the parent node $C\text{-}KGC_{id_j}$. The user executes $\{s_j, D_j\}\leftarrow$private-key-extract( ), $\{P_j, Q_j\}\leftarrow$public-key-extract( ) to set the private key and public key pair respectively. Each user device is configured with a memory and one or more processors. According to an embodiment herein, additional hardware such as dedicated circuits, a field programmable gate array (FPGA) are implemented in the user device. According to an embodiment herein, each user is configured to reside/exist on separate computers and/or browsers.

According to one embodiment herein, the S-KGC is an authorized software play store to get the registered the authenticated software from the third party software vendor and is configured to offer SaaS to the users with the collaboration of the software provider. The S-KGC is configured to receive the aggregated signature from the master C-KGC. The S-KGC is configured to verify the subscription requests from the plurality of users simultaneously. Further, the S-KGC is configured to identify the number of the software instances to be issued with license agreement under the C-KGCs. The S-KGC is configured to delegate the function/capacity/capability to issue the software license to the C-KGC. The S-KGC uses the public parameters of the R-KGC and executes $\{S_s, D_s\}\leftarrow$private-key-extract( ), $\{P_s, Q_s\}\leftarrow$public-key-extract( ) to set a private key and public key pair respectively.

According to one embodiment herein, a method is provided to generate the collaborative service provision access by using the HCL-AS for SaaS in cloud computing environment. The method involves a user making a request to utilize the subscription-based software as a service (SaaS) to a Controller Key Generation Center (C-KGC). The user utilizes the hierarchical certificateless signature (HCLS) to generate an authentication token and a service request token. The user's authentication is verified to access the requested software service in the cloud computing by the C-KGC. The C-KGC uses the authentication token to validate and verify the authenticity of the users to access the requested SaaS instance. The C-KGC uses the service request token to verify the credentials and authorization of the user for the requested service. A partial private key is generated by the C-KGC for the connected users. The C-KGC partial private key is combined with the user's secret key to get the user's private key. Thereafter, a user makes a subscription request to the cloud service provider for accessing the software services. The cloud provider receives such a subscription request and verifies the authorization of the users. According to one embodiment herein, the cloud provider is configured to aggregate the similar subscription requests from the plurality of users into a single subscription request and generates an aggregate signature. The aggregate signature is sent to the software play store. After verifying the aggregate signature, the software service is provided to the users from the software play store (S-KGC).

The embodiments herein disclose an architecture and a method for providing a secure authentication scheme for SaaS in cloud computing. Further, the architecture provides a collaborative SaaS attestation for authentication in cloud computing. The architecture is facilitated with a hierarchical certificateless aggregate signature (HCL-AS) for authentication and non-repudiation for SaaS. The software play store (S-KGC) issues a plurality of software instances and wherein the plurality of instances correspond to the number of the requests from an aggregated subscription request signature that is generated by the cloud provider using the HCL-AS rather than processing each cloud user's request individually. The advantage of the hierarchical scheme is in using a scalable architecture and an aggregate signature operation during the subscription requests. The scheme significantly reduces the computation and communication costs by verifying the aggregate signature in the hierarchical model from the users instead of verifying the n (number of) signatures from the n (number of) users independently.

According to one embodiment herein, the HCL-AS scheme in the disclosed architecture enables to generate a collaborative aggregate signature in response to a plurality of user requests (for software subscription services). According to one embodiment, the user utilizes the HCL-AS scheme to generate an authentication token and a service request token. The authentication token is verified to validate the authenticity of the user to access the requested SaaS service. The service request token is verified to check the credential and authorization of the user for the demanding service. When the authentication token and the service request token are verified, an aggregate signature is generated at a parent level of each user (child node) without a loss of identity of the user. Further, the aggregate signature is sent to the software play store (S-KGC), for verification and authentication of the user identity and the user requests. The hierarchical architecture comprises four modules. The four modules include a Root Key Generation Center (R-KGC), a Controller Key Generation Center (C-KGC), a set of Users, and a Software Play Store (S-KGC). The R-KGC along with C-KGC is configured to provide a secure and scalable authentication for the user request to access SaaS.

According to one embodiment herein, the Root Key Generation Center (R-KGC) is configured to generate a master public key (mpk) and a master secret key (msk). In HCL-AS, a hierarchical key agreement is managed by authorizing a request from each child node (user) to the root node in the hierarchical tree. The R-KGC is configured to initialize the hierarchical relationship between the participating entities such as the C-KGC, the users, and the S-KGC. In this process, the R-KGC initiates the partial private key generation process to the C-KGC. Then, each user (child node) sends a request to a corresponding parent node (C-KGC) to obtain a partial private key.

FIG. 1 illustrates a circuit block diagram of system architecture for secure collaborative SaaS (SecAtt-SaaS) for authentication in cloud computing environment, according to one embodiment herein. With respect to FIG. 1, the architecture is facilitated with a hierarchical certificateless aggregate signature (HCL-AS) for authentication and non-repudiation for SaaS. The software play store (S-KGC) issues as many software instances as the number of the requests rather than processing each cloud user's request individually and providing access to the user through the a hierarchical certificateless aggregate signature (HCL-AS). The advantage of the hierarchical scheme is in using a scalable architecture and an aggregate signature operations during the subscription requests. The scheme significantly reduces the computation and communication costs by verifying the aggregate signature from the users instead of verifying the n (number of) signatures from the n (number of) users independently.

According to one embodiment herein, the root key generation center (R-KGC) is configured to generate the public parameters by executing a function Setup ( ) with input of the security parameter k. According to one embodiment herein, the R-KGC is a dedicated server or as a part of a distributed network including memory and one or more processors. According to one embodiment herein, the R-KGC is provided with additional hardware and software components such as firewalls, and associated security mechanism. The R-KGC is connected to the child nodes over the network.

According to one embodiment herein, the Controller key generation center (C-KGC) is configured to function as a service authorization and authentication agent for the users. Further, the C-KGC is configured to function as a partial private key issuing authority to the users, a resource access controller, and a service request initiator for the users. Furthermore, the C-KGC is configured to function as a proxy agent to issue subscription service of user requested software's on behalf of the software provider S-KGC. The C-KGC is implemented in a distributed server over the zone wise distributed network having memory and one or more processors. The C-KGC has a web server to process the request of the users.

According to one embodiment herein, a user is configured with the parent node C-KGC. Each C-KGC is a part of the distributed server is configured at the level of different geographical zones. Each user device is configured with a memory and one or more processors. According to an embodiment herein, additional hardware such as dedicated circuits, a field programmable gate array (FPGA) are implemented in the user device. According to an embodiment herein, each of the users is configured to reside/exist on separate computers and/or browsers.

According to one embodiment herein, the S-KGC is an authorized software play store to get the registered the authenticated software from the third party software vendor and is configured to offer SaaS to the users with the collaboration of the cloud provider. The S-KGC is configured to receive the aggregated signature from the C-KGC. The S-KGC is configured to verify the subscription requests from the plurality of users simultaneously. Further, the S-KGC is configured to identify the number of the software instances to be issued with license agreement under the C-KGCs. The S-KGC is configured to delegate the function/capacity/capability to issue the software license to the C-KGC.

According to one embodiment herein, the HCL-AS provides a method to aggregate the n number of individual distributed user request signatures into a single collaborative aggregated signature. The HCL-AS is configured to perform the following steps. The last level in the architecture is configured as a set of users. Each user in the hierarchical tree structure has own identity information string that is used to establish a hierarchical key agreement by using the certificate-less identity based cryptography. After the key initialization process, each child node (user) in the hierarchical tree has own public/private key pair. The user generates the hierarchical certificate-less signature (HCLS) to request the required services from the parent node. A summation operation is performed on each parent node at the C-KGC level to compute the signatures that is sent by the users. The summation operation generates an aggregated version of the user request.

According to one embodiment herein, the architecture provides a mechanism to generate a resultant single collaborative aggregated signature at first level without performing multiple levels based summations and preserve the identity of the users in the resulting signature. The HCL-AS is configured to perform the following steps to overcome the problem of loss of the identity of the users during the level based summation. A shared secret key is accepted at each node at first level to make collaborative aggregate signature. A node at the first level is selected as a master node. The master node collects the aggregated signature broadcast from the remaining nodes at the first level. The master node has a shared secret key that is used to generate the single collaborative aggregated signature without the loss of identity of the users.

Figure 2:
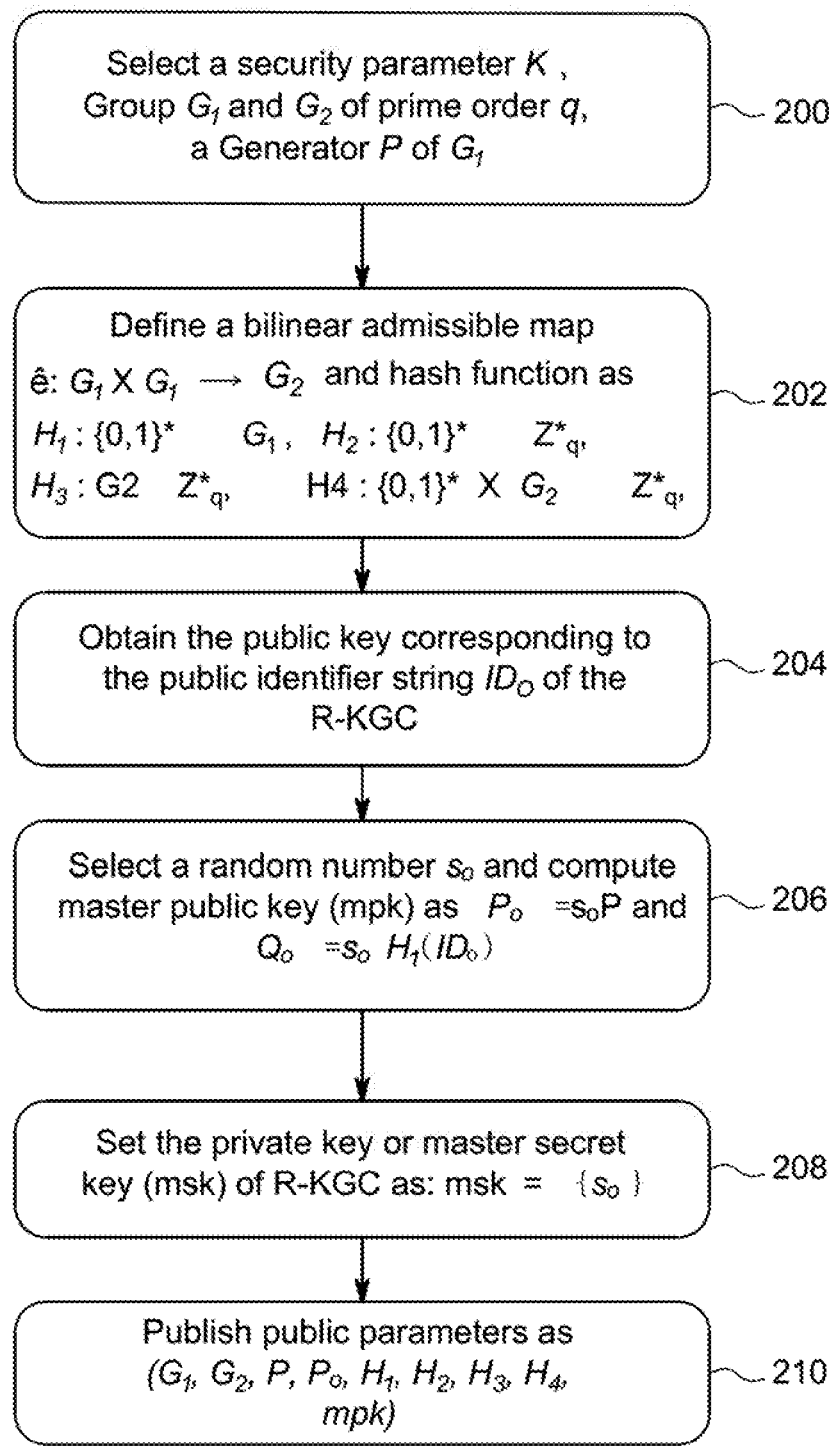
FIG. 2 illustrates a flowchart explaining a key initialization process in R-KGC in a SecAtt-SaaS architecture system during a system initialization and key generation process, according to one embodiment herein.

FIG. 2 illustrates a flowchart explaining a key initialization process in R-KGC in a SecAtt-SaaS architecture system during a system initialization and key generation process, according to one embodiment herein. The R-KGC enables a hierarchical key deployment model to the SecAtt-SaaS protocol. The R-KGC takes the security parameter K as an input and outputs the public parameters (params). The flowchart explains the algorithms executed by R-KGC including Setup( ), Set-Public-Key( ), and Set-Private-Key ( ) (200).

In Setup( ) process, with respect to a given a security parameter k, the R-KGC chooses a group $G_1$ and $G_2$ of prime order q, a generator P of $G_1$, a bilinear map ê: $G_1 \times G_1 \rightarrow G_2$ and the hash functions as follows:

$$H_1:\{0,1\}^* \rightarrow G_1 \cdot H_2:\{0,1\}^* \rightarrow Z_q^* \cdot H_3:G_2 \rightarrow Z_q^* \cdot H_4: \{0,1\} \times G_2 \rightarrow Z_q^* \quad (202)$$

In Set-Public-Key( ) process, with respect to a given an input $ID_o$ as an identity of the R-KGC (204). The algorithm selects a random number $s_o \in Z_q^*$ and computes the public key as: $P_o = s_o P$ and $Q_o = s_o H_1(ID_o)$ where $ID_o$ is the identification string of the R-KGC (206). Then, the R-KGC set the master public key (mpk)=($P_o$; $Q_o$). Further, a random number $s_o$ is selected to compute master public key (mpk) as $P_o = s_o P$ and $Q_o = s_o H_1(ID_o)$ (208).

In Private-Key-Extract( ), the R-KGC sets the private key or master secret key (msk)=$s_o$ (208). After the execution of the R-KGC Setup, the R-KGC defines the master secret key ($s_o$) and master public key pair ($P_o$; $Q_o$) and publishes the parameters ($G_1$; $G_2$; P; $P_o$; $Q_o$; $H_1$; $H_2$; $H_3$; $H_4$) as a public parameter (210).

Figure 3:
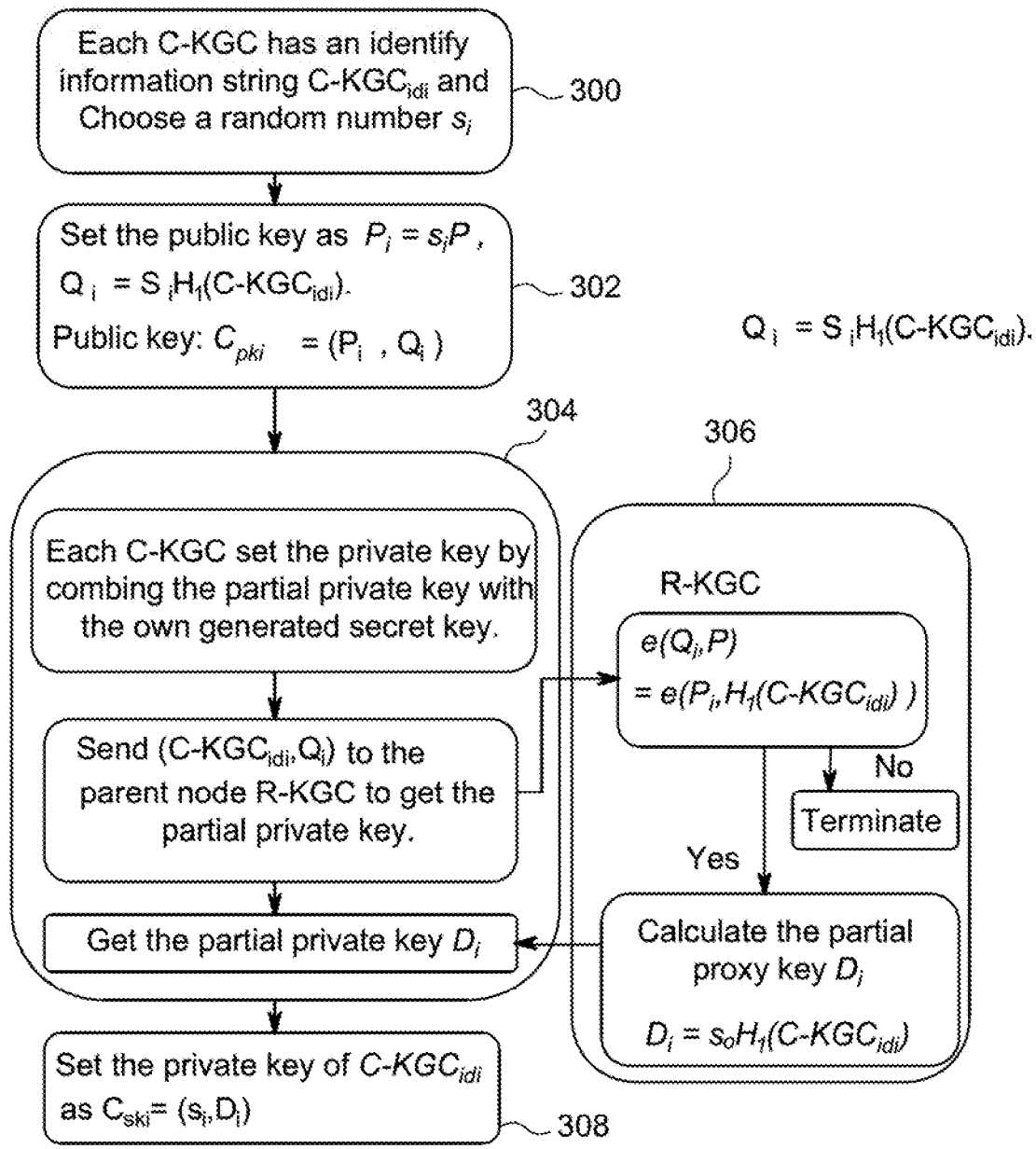
FIG. 3 illustrates a flowchart explaining a key initialization process in C-KGC in a SecAtt-SaaS architecture system during a system initialization and key generation process, according to one embodiment herein.

FIG. 3 illustrates a flowchart explaining a key initialization process in C-KGC in a SecAtt-SaaS architecture system during a system initialization and key generation process, according to one embodiment herein. The Controller Key Generation Center (C-KGC) makes coordination with the R-KGC to derive the public/private key pairs. Each C-KGC is distinguished by the C-KGC$_{id_i}$, 1≤i≤k where k is the number of C-KGC. When a new C-KGC joins the system, then, it runs the C-KGC setup protocol with the root node R-KGC to set a public/private key pairs. The C-KGC executes the algorithms Set-Public-Key( ), Partial-Private-Key-Extract( ), and Private-Key-Extract( ).

On the input of the C-KGC$_{id_i}$, the Set-Public-Key( ) algorithm chooses a random number $s_i \in Z_q^*$ as the secret value (300). Then, the C-KGC computes $P_i=s_iP$ and $Q_i=s_iH_1$ (C-KGC$_{id_i}$) as a C-KGC public key (302). Now, C-KGC has a public key $C_{pk_i}=(P_i; Q_i)$.

Each C-KGC set the private key by combing the partial private key with the own generated secret key. Partial-Private-Key-Extract function ( ) is executed by the R-KGC on the inputs of C-KGC$_{id_i}$ and $P_i$ that is sent by the C-KGC$_i$. Before issuing the partial private key requested by the C-KGC, the R-KGC confirms the authentication of the C-KGC as follows:

$$e(Q_i,P)=e(P_i,H_1(C\text{-}KGC_{id_i})) \quad (306)$$

When the verification e(Q$_i$, P) is true, then the R-KGC uses the maser secret key to generate the partial private key D$_i$ of C-KGC$_i$ as follows:

$$D_i=s_oH_1(C\text{-}KGC_{id_i})$$

Further, the partial private key D$_i$ is sent to the C-KGC$_i$ in a secure manner.

According to one embodiment herein, in Private-Key-Extract function ( ), the C-KGC combines its own generated secret Key S$_i$ with the partial private key D$_i$ to get the C-KGC private key pair C$_{sk_i}$ as (s$_i$, D$_i$) (308).

Figure 4:
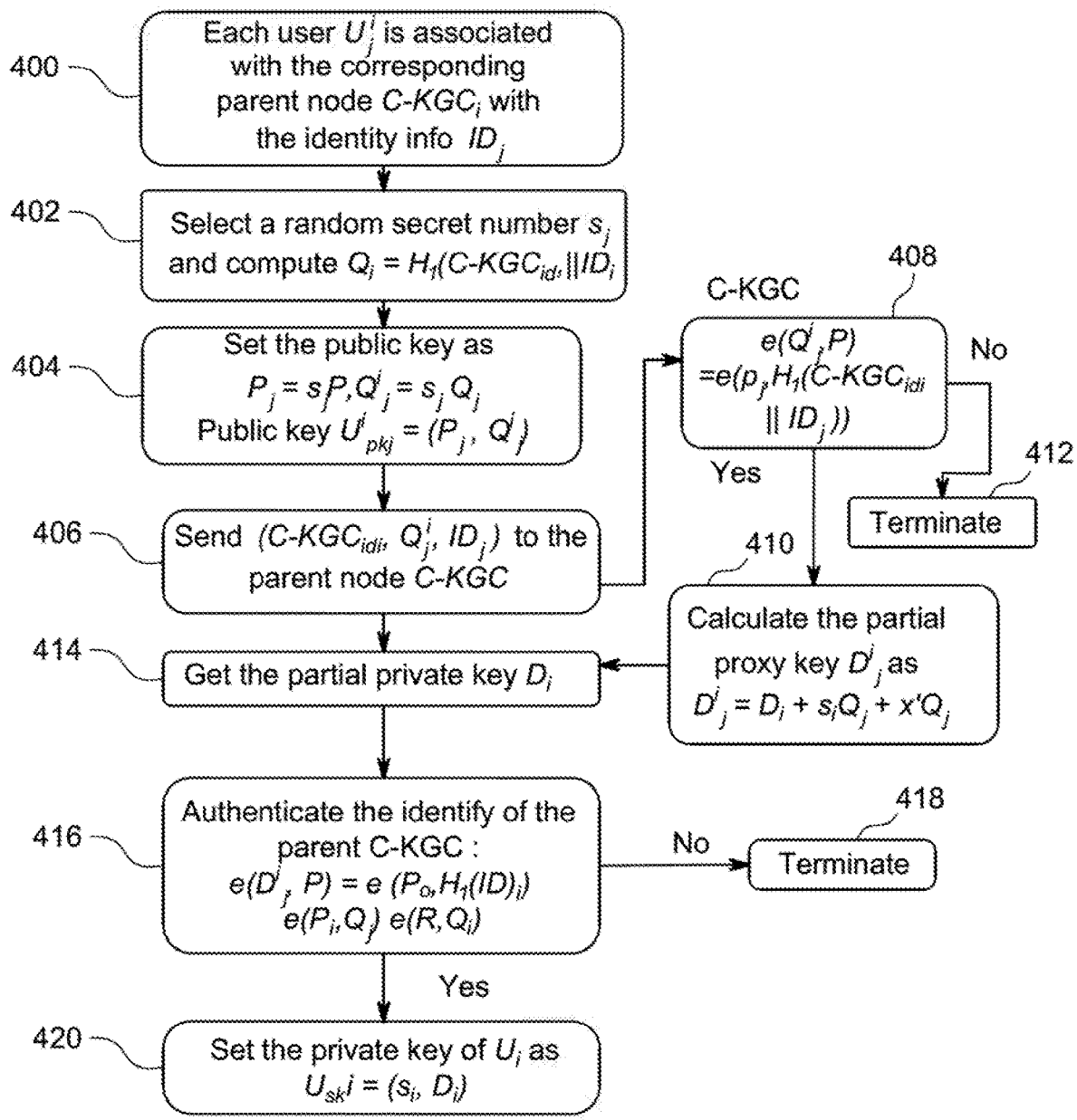
FIG. 4 illustrates a flowchart explaining a user key initialization process in a SecAtt-SaaS architecture system during a system initialization and key generation process, according to one embodiment herein.

FIG. 4 illustrates a flowchart explaining a user key initialization process in a SecAtt-SaaS architecture during a system initialization and key generation process, according to one embodiment herein. The C-KGC enables to configure the dynamic user's management in the hierarchical model. When a user joins the C-KGC$_i$, then the user and C-KGC$_i$ group together to provide scalable key agreement operations to derive the public/private key pair of the users. In the user key setup, the users execute the algorithm Set-Public-Key ( ), Partial-Private-Key-Extract( ), and Private-Key-Extract ( ). According to an embodiment herein, a user (U$_j^i$) represents the j$^{th}$ user of the i$^{th}$ C-KGC that wants to perform the key establishment as described in steps 402 to 420 (400).

According to one embodiment herein, Set-Public-Key( ) initializes the public key. On the input of ID$_j$, the algorithm chooses a random number, $s_j \in Z_q^*$ as the secret value. Then, the user computes $P_j=s_jP$; $Q_j=H_1(C\text{-}KGC_{id_i}\|ID_j)$ and $Q_j^i=s_jQ_j$ where C-KGC$_{id_i}$ is the identification string of the parent C-KGC. The user sets the public key U$_{pk_j}^i=(P_j, Q_j^i)$.

According to one embodiment herein, Partial-Private-Key-Extract( ) algorithm is executed by the parent C-KGC on the inputs (C-KGC$_{id_i}$, ID$_j$), that is send by the user U$_i$. Before issuing the partial private key to the requested users, the parent C-KGC verifies the authenticity of the users as follows:

$$e(Q_j^i,P)=e(P_j,H_1(C\text{-}KGC_{id_i}\|ID_j))$$

When the verification is true, then the C-KGC$_{id_i}$ uses the own partial private key (D$_i$) to generate the partial private key (D'$_j$) of the user. The partial private key generation algorithm establishes a hierarchical key agreement between the participating entities (User, Parent node, and Root node). The C-KGC$_{id_i}$ computes the partial private key D'$_j$ for the corresponding user U$_j^i$.

According to one embodiment herein, Private-Key-Extract( ) algorithm is executed by the user to define the private key (U$_{sk_j}$). The user confirms the authenticity of the parent C-KGC and accepts the partial private key D$_j^i$ as follows:

$$e(D_j^i,P)=e(P_o,H_1(ID)_i)e(P_i,Q_j)e(R,Q_i)$$

When the said verification is correct then the user accept the partial private key D$_j^i$ and sets the private key as U$_{sk_j}$=(s$_j$; D$_j$). The user sets the public key pair U$_{pk_j}$=(P$_j$; Q$_j^i$), private key pair U$_{sk_j}$=(s$_j$; D$_j$) and a secret key s$_j$.

Figure 5:
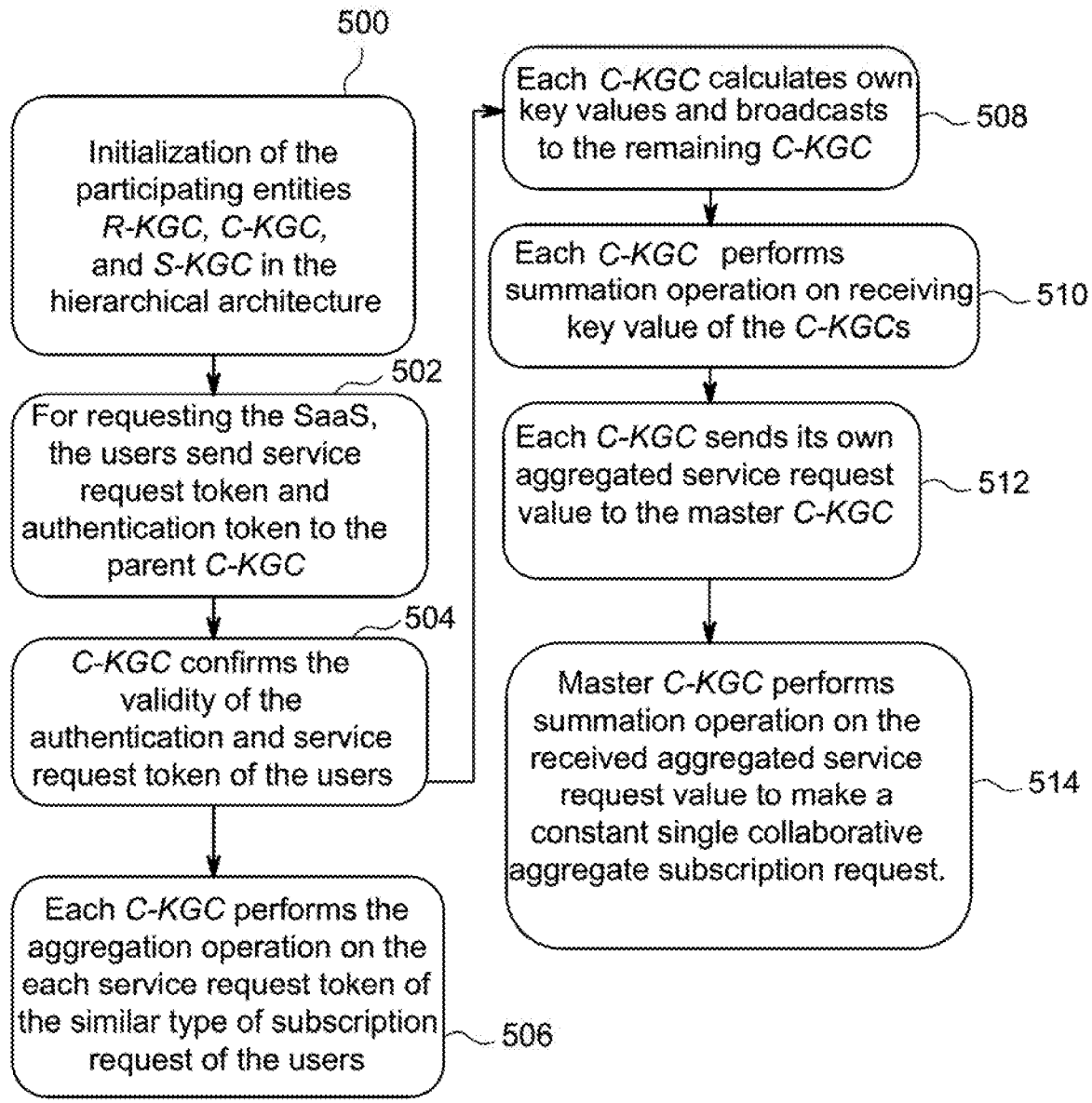
FIG. 5 illustrates a flowchart explaining a method to generate the collaborative service provision access by using the HCL-AS for the SaaS in cloud computing environment, according to one embodiment herein.

FIG. 5 illustrates a flowchart explaining a method to generate the collaborative service provision access by using the HCL-AS for the SaaS in cloud computing environment, according to one embodiment herein. The method includes initialization of participating entities in the hierarchical architecture (500). Further, the users initiate a request to utilize the subscription-based software as a service (SaaS) to a Controller Key Generation Center (C-KGC).

The method includes a user generating a service request token and authentication token for requesting of the SaaS and authentication of the users respectively (502). The user utilizes the HCLS to generate an authentication token and a service request token and sends to the parent C-KGC. Each C-KGC performs the user's authentication to verify the accessibility of the requested software service by the user in the cloud computing. The C-KGC uses the authentication token to validate and verify authenticity of the users to access the requested SaaS instance (504). The C-KGC uses the service request token to verify the credentials and authorization of the user for the requested service. The cloud provider receives the subscription request and verifies the authorization of the users. According to one embodiment herein, the cloud provider aggregates the similar subscription requests from the plurality of users into a single subscription request and generates an aggregate signature (506). A partial private key is generated by the C-KGC and broadcasted to the users connected thereto (508). The C-KGC's partial private key is combined with the user's secret key to get the user's private key. A summation operation is performed on receiving the key value of the C-KGCs (510). Further, the aggregated service request value is sent to a master C-KGC by each C-KGC (512). The master C-KGC uses a common shared secret key as a shared multi-proxy subscription key token on the inputs of the received aggregated service request value to generate a constant single collaborative service request signature (514). Thereafter, the aggregate service request signature is sent to the software play store. After verifying the aggregate service request signature, the requested software service is provided to the users from the software play store.

Figure 6:
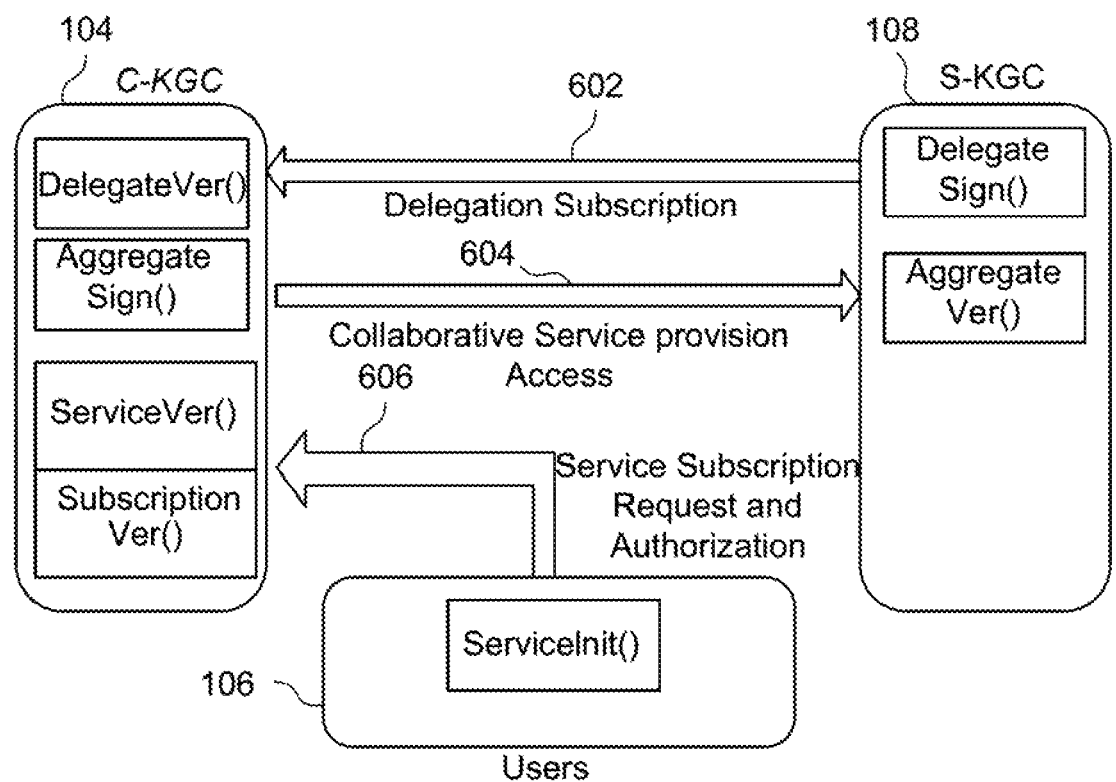
FIG. 6 illustrates a functional block diagram of for secure collaborative SaaS (Secatt-SaaS) for authentication in cloud computing environment, according to one embodiment herein.

FIG. 6 illustrates a functional block diagram of for secure collaborative SaaS (SecAtt-SaaS) for authentication in cloud computing environment, according to one embodiment herein. With respect to FIG. 6, the system architecture is configured to provide a collaborative SaaS attestation for authentication in cloud computing environment. The architecture is facilitated with a hierarchical certificateless aggregate signature (HCL-AS) for authentication and non-repudiation for SaaS. The Hierarchical certificateless aggregate signature (HCL-AS) provides a scalable authentication model for the SaaS in cloud computing environment. The HCL-AS is configured to generate a collaborative aggregate signature at the parent level of the child node (users) without the loss of identity of the users in the resulting signature. The architecture is configured to provide a scalable architecture and an aggregate signature operations during the subscription requests for the SaaS in the cloud computing. The HCL-AS significantly reduces the computation and communication costs during the verification of the users authentication instead of verifying n signatures and the user request independently.

According to one embodiment herein, a parent node in the hierarchical tree structure is configured to act as an authenticator to verify and approve the associated child node rather than performing the group authentication for the other users of child nodes. When several requests from the users for common services are received, then the parent node C-KGC collaboratively generates the aggregate service request signatures to enable many to one authentication of the requested users and sends to the software play-store (S-KGC). The S-KGC is configured to perform the verification over an aggregate service request signature and confirms the authentication of the users.

According to one embodiment herein, the C-KGC 104 establishes the trustworthy collaboration with S-KGC 108 in Delegate subscription phase 602, by validating the authenticity of the third party software provider. In this process, the S-KGC transfers the partial delegation of copyright to the C-KGC, so that the C-KGC is configured to confirm a trustworthy relation between the users and the S-KGC for using the requested services. The S-KGC delegates the partial delegation of copyright by executing the DelegateSign( ) and C-KGC accepts When DelegateVer( ) returns true.

According to one embodiment herein, the user 106 makes a request in Service Subscription Request and Authorization phase 606, to utilize the subscription based software as a service (SaaS) to the C-KGC by executing the ServiceInit( ). The user 106 generates the HCLS for requesting the software services and sends the same to the C-KGC. The C-KGC verifies the authenticity of the users and makes a request to the registered software provider S-KGC by executing the algorithm ServiceVer( ). On the basis of a user request, the C-KGC authenticates the users request for software subscription services by executing the algorithm SubscriptionVer( ).

According to one embodiment herein, the algorithm SubscriptionVer( ) returns true when each user belonging to the corresponding C-KGC accepts an agreement about terms and conditions of the software provider. The C-KGC 104 confirms whether the user accept the terms and condition of the requested service or not. Then, each C-KGC 104 combines the authentication token as an acceptance of the terms and condition with the user message m. Next, each C-KGC collaboratively executes AggregateSig( ) to generate a common subscription request signature. In the aggregation of the C-KGC's subscription signatures, one member of the C-KGC is selected as a master C-KGC. The master C-KGC combines the subscription signature by each C-KGC to generate a single combined subscription signature by using the HCL-AS. The S-KGC 108 verifies the subscription signature by executing an algorithm AggregateVer( ) and convinces to ensure the number of users that want to use the software instance on pay-per-use model.

Figure 7:
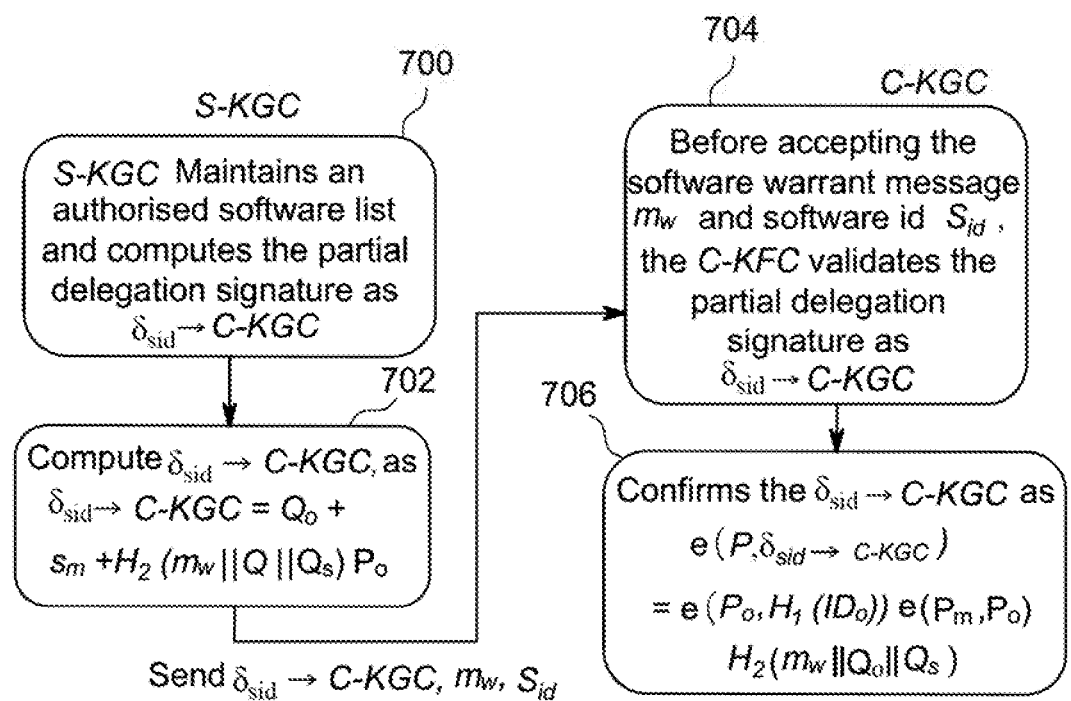
FIG. 7 illustrates a flowchart explaining in detail the method of the delegation subscription phase involved in secure collaborative SaaS (SecAtt-SaaS) authentication, in accordance with one embodiment herein.

FIG. 7 illustrates a flowchart explaining in detail the method of the delegation subscription phase involved in secure collaborative SaaS (SecAtt-SaaS) authentication, in accordance with one embodiment herein. In this method, the C-KGC establishes trustworthy collaboration with the S-KGC by validating the authenticity of the third party software provider. In this process, the S-KGC transfers the partial delegation of copyright to the C-KGC, so that the C-KGC confirms the trustworthy relation between users and S-KGC for using the services. The S-KGC delegates the partial delegation of copyright by executing the DelegateSign( ) and the C-KGC accepts when DelegateVer( ) returns true. The internal structure of each of the two algorithms in accordance with a preferred embodiment is formally defined as follows.

The S-KGC executes the DelegateSign( ) algorithm to delegate the partial delegation of copyright of the registered software to the C-KGC (700). The S-KGC computes the partial delegation signature $\delta_{s_{id} \to C\text{-}KGC}$ as follows:

$$\delta_{s_{id} \to C\text{-}KGC} = Q_o + s_m + H_2(m_w \| Q_o \| Q_s) P_o \quad (702)$$

The S-KGC sends ($\delta_{s_{id} \to C\text{-}KGC}$, $m_w$, $s_{id}$) to any C-KGC for preparing the common authorized software vendors list in the cloud. Before accepting a software warrant message $m_w$ and software id $s_{id}$ from the third party software provider, the C-KGC validates the partial delegation signature as $\delta_{s_{id} \to C\text{-}KGC}$ (704).

The C-KGC receives ($\delta_{s_{id} \to C\text{-}KGC}$, $m_w$, $s_{id}$) and confirms the partial delegation of the subscription ownership of the software instance ($\delta_{s_{id} \to C\text{-}KGC}$) by executing the DelegateVer ( ) as follows:

$$e(P, \delta_{s_{id} \to C\text{-}KGC}) = e(P_o, H_1(ID_o)) e(P_m, P_o) H_2(m_w \| Q_o \| Q_s) \quad (706)$$

According to one embodiment herein, the S-KGC and C-KGC executes the algorithm DelegateSign( ) and DelegateVer( ) respectively to establish the trustworthiness collaboration between them and S-KGC transfers the copyright delegation of the authentic software instance to the C-KGC (cloud provider). The C-KGC issues the subscription based software instances to the users with the guarantee of the collaboration to the S-KGC.

Figure 8:
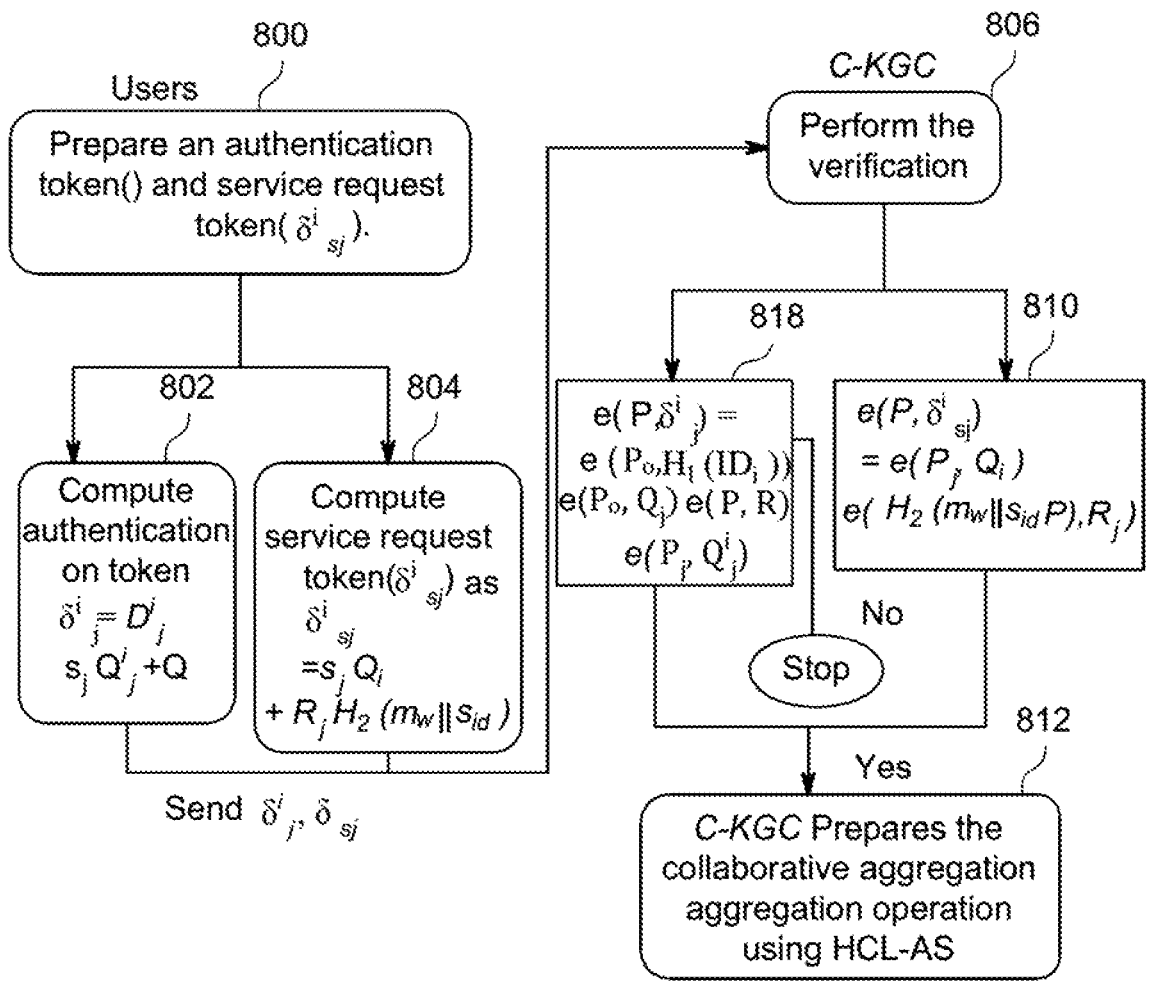
FIG. 8 illustrates a flowchart explaining the method of the Service subscription request and authorization phase involved in secure collaborative SaaS (SecAtt-SaaS) authentication, according to one embodiment herein.

FIG. 8 is a flowchart illustrating in detail the method of the Service subscription request and authorization phase involved in secure collaborative SaaS (SecAtt-SaaS) authentication, according to one embodiment herein. In this method, the users make a request to utilize the subscription based software as a service (SaaS) to the C-KGC by executing the ServiceInit( ). The user generates the HCLS for requesting the software services and sends to the C-KGC. The C-KGC verifies the authenticity of the users and make a request to the registered software provider S-KGC by executing the algorithm ServiceVer( ). The C-KGC authenticates the user's request for software subscription services by executing the algorithm SubscriptionVer( ).

According to one embodiment herein, ServiceInit( ) algorithm is executed by the users to make a request for using the software services. In aforementioned process, the user prepares an authentication token ($\delta_j^i$) and a service request token ($\delta_{sj}^i$) as follows (800). The method includes selecting a random number $x \in Z_q^*$ and computing Q as follows:

$$Q = xP, R = R' + Q.$$

Further, an authentication token ($\delta_j^i$) is computed as follows.

$$\delta_j^i = D_j' + s_j Q_j^i + Q \quad (802)$$

A service request token ($\delta_{sj}^i$) is computed as follows.

$$\delta_{sj}^i = s_j Q_i + R_j' H_2(m_w \| s_{id}) \quad (804)$$

At the end of calculation, the user sends the values of ($\delta_j^i$, $\delta_{sj}^i$, Q, $s_{id}$, $m_w$) to the C-KGC.

The parent C-KGC$_i$ receives ($\delta_j^i$, $\delta_{sj}^i$, Q, $s_{id}$, $m_w$) from the child node user U$_j$ and executes ServiceVer( ) and SubscriptionVer( ) to verify the authentication token ($\delta_j^i$) and a service request token ($\delta_{sj}^i$) respectively as follows.

In ServiceVer( ), the C-KGC uses the authentication token ($\delta_j^i$) to validate the authenticity of the users by computing R=R'+Q, where R' is the shared secret element between the user and C-KGC as follows (806).

$$e(P, \delta_j^i) = e(P_o, H_1(ID_i)) e(P_i, Q_j) e(P, R) e(P_j, Q_j^i) \quad (808)$$

When verification based on equation (1) is true, then the C-KGC executes the SubscriptionVer( ) on the input of the service request token ($\delta_{sj}^i$) to validate the user request and register the instance of the requesting services. The C-KGC performs the verification of subscription token as follows:

$$e(P, \delta_{sj}^i) = e(P_j, Q_i) e(H_2(m_w \| s_{id} P), R_j) \quad (810)$$

When verification based on equation (1) and (2) are true, then the C-KGC generates the aggregated version of the service request token of the users and sends to the S-KGC (812). The S-KGC confirms the authentication of the C-KGC and issues the software instance to be used by the users.

According to one embodiment herein, the users execute the ServiceInit( ) algorithm to calculate an authentication token ($\delta_j^i$) and a service request token ($\delta_{sj}^i$) and send to the parent C-KGC. The C-KGC verifies the authenticity of the users and make a request to the registered software provider in S-KGC by executing the algorithm ServiceVer( ). The C-KGC authenticates the users request for software subscription services by executing the algorithm SubscriptionVer( ). When the SubscriptionVer( ) algorithm returns true, then each user belonging to the corresponding C-KGC accepts a commitment about to agreement of terms and conditions of the software provider.

Figure 9:
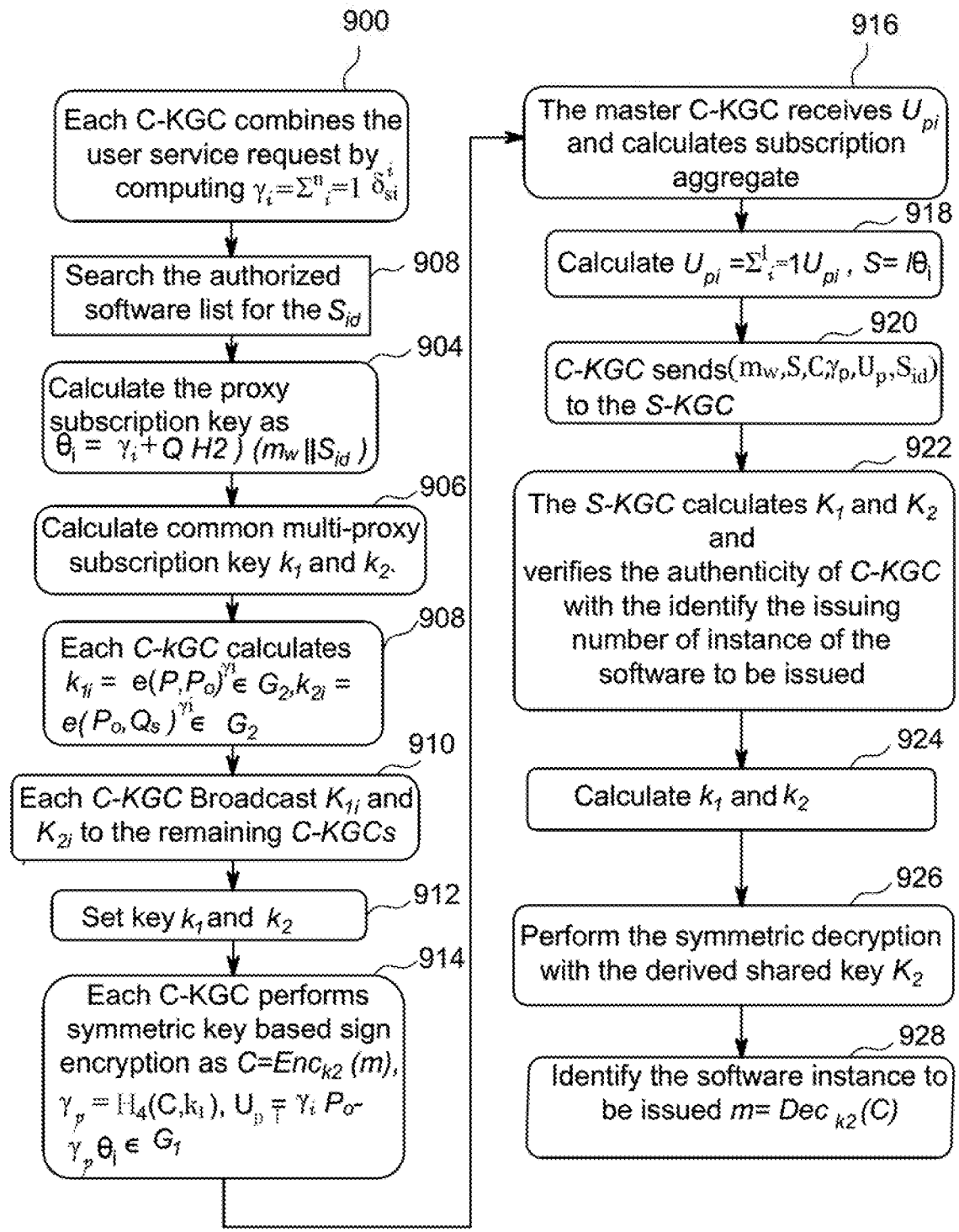
FIG. 9 illustrates a flowchart explaining the method of the collaborative service provision access phase involved in secure collaborative SaaS (SecAtt-SaaS) authentication, according to one embodiment herein.

FIG. 9 is a flowchart illustrating in detail the method of the collaborative service provision access phase involved in secure collaborative SaaS (SecAtt-SaaS) authentication, according to one embodiment herein. In the method, the C-KGC generates the aggregated version of the service request signature of the users using the HCL-AS. During the process, the C-KGC confirms whether the users accept the terms and condition of the requested service or not. Then, each C-KGC combines the authentication token as an acceptance of the terms and condition with the user message m. Each C-KGC collaboratively executes AggregateSig( ) to generate a common subscription request signature. In the aggregation of the C-KGC's subscription signatures, one member of the C-KGC is selected as a master C-KGC. The master CKGC combines the subscription signature by each C-KGC to generate a single combined subscription signature by using the HCL-AS. The S-KGC can verify the subscription signature by executing the algorithm AggregateVer( ) and convinces to ensure the number of users that want to use the software instance on pay-per-use model.

According to one embodiment herein, AggregateSign( ) algorithm is executed by the C-KGC to generate a single combined subscription request signature by using the HCL-AS as follows:

(i) When the user gets verified by the SubscriptionVer( ) algorithm, then the C-KGC computes $$\gamma_i \Sigma_{j=1}^n \delta_{sj}^i \quad (900)$$

where 'i' denotes C-KGC and 'j' represents the user who is requesting for the services.

(ii) An authorized software list is searched for Sid (902). Each of the C-KGC$_i$ acts as a proxy subscription owner to generate the proxy subscription key as follows.

$$\varphi_i = \gamma_i + Q_i H_2(m_w \| s_{id}) \quad (904)$$

(iii) All C-KGCs collaborate to calculate a shared multi-proxy subscription key $k_1$ and $k_2$ as follows (906). Each of the C-KGC$_i$, 1≤i≤m, selects a random number $r_i \in Z_q^*$ and computes $$k_{1i} = e^{(P, P_o)^{r_i}} \in G_2$$

$$k_{2i} = e^{(P_o, Q_s)^{r_i}} \in G_2 \quad (908)$$

(iv) Each C-KGC$_i$ broadcasts $k_{1i}$ and $k_{2i}$ to the remaining C-KGCs (910). Then, the C-KGCs calculate a shared multi-proxy subscription key as follows:

$$k_1 = \prod_{i=1}^{t} k_{1i} \in G_2$$

$$k_2 = H_3\left(\prod_{i=1}^{t} k_{2i}\right) \in G_2$$

(v) After, agreeing upon a common shared multi-proxy subscription key ($k_1, k_2$) (912), the C-KGC performs the signcryption as follows:

$$C = Enc_{k_2}(m)$$

$$r_p = H_4(C, k_1)$$

$$U_{pi} = r_i P_o - r_p \varphi_i \in G_1 \quad (914)$$

(vi) Further, each of the C-KGC sends the $U_{pi}$ to the master C-KGC. The master C-KGC is a random from the C-KGCs who combines the entire calculated signcryption token $U_{pi}$ to an aggregated subscription request signature $U_p$ (916). The master C-KGC calculates the $U_p$ as follows.

$$U_p = \sum_{i=1}^{t} U_{pi} \quad (918)$$

$$S = l\varphi_i$$

(vii) The master C-KGC sends the values of ($m_w$, S, C, $r_p$, $U_p$, $s_{id}$) to the S-KGC (920).

According to one embodiment herein, AggregateVer( ) algorithm is executed by the S-KGC to confirm the number of subscriptions required to activate for accessing the requested software instance $S_{id}$ to the users through the corresponding C-KGC. In this process, after receiving ($m_w$, S, C, $r_p$, $U_p$, $s_{id}$) from the master C-KGC, the S-KGC calculates the shared multi-proxy subscription key token ($k_1, k_2$) to issue the subscription of the requested services as follows (922):

$$k_1 = e(P, U_p) e(P, S)^{r_p} e\left(P, \sum_{i=1}^{t} Q_i\right)^{r_p H_2(m_w \| s_{id})} \quad (924)$$

$$k_2 = e(U_p, Q_s) e(S, Q_s)^{T_p} e\left(H_1(m_w \| s_{id}), \sum_{i=1}^{t} Q_i\right)^{r_p s_p}$$

The S-KGC accepts the aggregated subscription request signature when $$r_p == H_3(C, k_2) \quad (1)$$

When the equation (1) is satisfied, then the S-KGC decrypts the message m by symmetric algorithm as follows:

$$m = Dec_{k_2}(C) \quad (928)$$

According to one embodiment herein, the user generates the subscription request ($\delta_j^i, \delta_{sj}^i$) on the input of the own identity information $ID_j^i$ with the private key $U_{sk_j}^i$ on the message m. Thereafter, the C-KGC performs an aggregation operation on the subscription request $(\delta_j^i, \delta_{sj}^i)$ to get a combined aggregated subscription request.

According to one embodiment herein, each C-KGC is configured to generate aggregated subscription request using summation operation. However, aggregation operations using summation operation at the level of the C-KGC may loss the identity of the users because it may overlap with the identity of the C-KGC during the multiple aggregation operation in the C-KGC's. Considering the said problem, the embodiments herein approaches a solution by enabling the collective agreement for the shared secret key token $(k_1, k_2)$ among the C-KGCs. Then, each C-KGC includes shared secret key token $(k_1, k_2)$ that integrates the user generated subscription requests to generate a combined C-KGC aggregated subscription request.

According to one embodiment herein, one of the C-KGCs among all C-KGC is selected as a master C-KGC to enable the final aggregation operation.

According to one embodiment herein, the master C-KGC performs the aggregation operation on the requested services to calculate the aggregated subscription values $(U_p, S)$.

According to one embodiment herein, the aggregated subscription request $(U_p, S)$ is sent to the S-KGC to identify the requested software instances to be activated to the users and to convince with the identity of the C-KGCs and the corresponding users.

The embodiments herein provide an architecture and a method for providing a secure authentication scheme for SaaS in the cloud computing environment. Further, the architecture provides a collaborative SaaS attestation for authentication in cloud computing. The architecture is facilitated with a hierarchical certificateless aggregate signature (HCL-AS) for authentication and non-repudiation for SaaS. The Hierarchical certificateless aggregate signature (HCL-AS) provides a scalable authentication model for the SaaS in cloud computing environment. The HCL-AS generates a collaborative aggregate signature at the parent level of the child node (users) without the loss of identity of the users in the resulting signature. The method uses a scalable architecture and an aggregate signature operations during the subscription requests for the SaaS in the cloud computing environment. The HCL-AS model significantly reduces the computation and communication cost during the verification of the users authentication instead of verifying n signatures and the user request independently.

The description of the specific embodiments herein completely revealed the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A computer implemented method comprising instructions stored on a non-transitory computer-readable storage medium and executed on a computing device provided with a hardware processor and a memory for providing a hierarchical certificateless aggregate signature architecture for authentication and nonrepudiation of Software as a Service (SaaS), the method comprising:
   receiving a subscription request from a user device for accessing software services (SaaS) from a cloud server;
   initializing a hierarchical relationship among a controller key generation center (C-KGC), a plurality of users, and a Software Key Generation Center (S-KGC) by a Root key generation Center (R-KGC);
   generating an authentication token and a service request token for the subscription request by the R-KGC;
   verifying authenticity of a user to access the SaaS service by the C-KGC through the generated authentication token;
   verifying credential of the user by the C-KGC using the generated service request token;
   aggregating a plurality of subscription requests received from the plurality of users into an aggregated subscription request by the C-KGC;
   generating an aggregate signature for the aggregated subscription request after verification of the authentication token and the service request token by the C-KGC;
   receiving the aggregate signature by the S-KGC and further verifying the aggregate signature by the S-KGC to provide software service corresponding to the subscription request
   generating a public parameter for a user by a root key generation center, wherein the public parameter comprises a master public key (mpk) and a master secret key (msk);
   performing service authorization and authentication for the users by a controller key generation center (C-KGC), wherein the controller key generation center is further configured to generate a partial private key to the users; and
   verifying the subscription request from a plurality of users simultaneously by the Software Key generation Center (S-KGC) or a Software Play store.

2. The method as claimed in claim 1, wherein the step of generating an aggregate signature further comprises:
   generating an aggregate signature at a parent level of each user without the loss of identity of the user; and
   transmitting the aggregate signature from the C-KGC to the S-KGC, wherein the S-KGC is configured to perform verification of a user identity and the plurality of user requests.

3. The method as claimed in claim 1 further comprises establishing a hierarchical relationship from a root node to a plurality of child nodes or users collaboratively.

4. The method as claimed in claim 3, wherein the controller key generation center (C-KGC) is a web server and is configured to process the plurality of subscription requests from the plurality of users.

5. The method as claimed in claim 3 further comprises delegating a capability to issue the software license to the C-KGC by the S-KGC.

6. A computer system architecture for providing a hierarchical certificateless aggregate signature (HCL-AS) for the authentication and nonrepudiation of SaaS in a cloud computing system, the architecture comprising:
   a root key generation center (R-KGC) configured to receive a subscription request from a user device for accessing software services (SaaS) from a cloud server, and wherein the R-KGC is configured to generate a public parameter for the user, and wherein the R-KGC is configured to initialize a hierarchical relationship among a Controller Key Generation Center (C-KGC), a plurality of users, and a Software Key Generation Center (S-KGC), and wherein the public parameter comprises a master public key (mpk) and a master secret key (msk);

a plurality of controller key generation centers (C-KGC) configured to perform service authorization, and wherein the controller key generation center is further configured to perform authentication for the plurality of users, and wherein the controller key generation center is further configured to generate a partial private key to the users, and wherein the partial private key is used to perform a hierarchical authentication of a node associated to the C-KGC, and wherein the C-KGC is configured to generate an aggregated subscription request or aggregate signature by combining a plurality of subscription requests;

wherein the software key generation center (S-KGC) is configured to receive the aggregated signature from the C-KGC, and wherein the S-KGC is configured to verify the aggregated signature and further provide software service corresponding to the subscription request, and wherein the C-KGC is further configured to invoke a private key extract function by combining the master secret key generated from the R-KGC with the partial private key generated by a parent node C-KGC, and wherein the S-KGC is configured to use the public parameters generated by the R-KGC and execute-key-extract function and a public-key-extract function to generate a private key and a public key pair respectively.

7. The architecture as claimed in claim 6, wherein the C-KGC is further configured to generate a combined subscription request signature at a parent level of each user by combining a plurality of subscription requests.

8. The architecture as claimed in claim 6, wherein the C-KGC is further configured to generate an aggregated subscription request or aggregate signature by aggregating the plurality of combined subscription request signature at the parent level.

9. The architecture as claimed in claim 6, wherein the C-KGC is further configured to transmit the aggregated subscription request or aggregate signature to the S-KGC.

10. The architecture as claimed in claim 6, wherein the controller key generation center is a web server and is configured to process requests from the users.

11. The architecture as claimed in claim 6, wherein the S-KGC is further configured to perform verification and authentication of the user identity and a plurality of user requests.

12. The architecture as claimed in claim 6, wherein the S-KGC is further configured to identify the number of the software instances to be issued with license agreement under the C-KGCs.

* * * * *